United States Patent
Bergström

(10) Patent No.: US 12,501,374 B2
(45) Date of Patent: Dec. 16, 2025

(54) REPORTING IN WIRELESS COMMUNICATION NETWORKS

(71) Applicant: Telefonaktiebolaget LM Ericsson (publ), Stockholm (SE)

(72) Inventor: Mattias Bergström, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 396 days.

(21) Appl. No.: 18/015,733

(22) PCT Filed: Jul. 14, 2021

(86) PCT No.: PCT/SE2021/050726
§ 371 (c)(1),
(2) Date: Jan. 12, 2023

(87) PCT Pub. No.: WO2022/019818
PCT Pub. Date: Jan. 27, 2022

(65) Prior Publication Data
US 2023/0276376 A1 Aug. 31, 2023

Related U.S. Application Data

(60) Provisional application No. 63/054,836, filed on Jul. 22, 2020.

(51) Int. Cl.
*H04W 52/36* (2009.01)
*H04W 24/10* (2009.01)

(52) U.S. Cl.
CPC ......... *H04W 52/365* (2013.01); *H04W 24/10* (2013.01); *H04W 52/367* (2013.01)

(58) Field of Classification Search
CPC . H04W 52/36; H04W 52/365; H04W 52/367; H04W 24/10; H04L 1/0026; H04L 1/0029
See application file for complete search history.

(56) References Cited

U.S. PATENT DOCUMENTS 4,779,577 A * 10/1988 Ritter ................. F01P 7/02
123/41.12
6,965,816 B2 * 11/2005 Walker ................. G08B 31/00
701/16

(Continued)

FOREIGN PATENT DOCUMENTS

CN 103299690 A 9/2013
CN 107613523 A 1/2018
(Continued)

OTHER PUBLICATIONS

3GPP, "3GPP TS 38.321 V16.0.0", 3rd Generation Partnership Project; Technical Specification Group Radio Access Network; NR; Medium Access Control (MAC) protocol specification (Release 16), Mar. 2020, 1-141.

(Continued)

*Primary Examiner* — Hai V Nguyen
(74) *Attorney, Agent, or Firm* — Murphy, Bilak & Homiller, PLLC

(57) ABSTRACT

A method is performed by a wireless device for reporting to a base station, the wireless device being configured with one or more first criteria and one or more second criteria for triggering transmission of a report message, a first timer associated with the one or more first criteria, and a second timer associated with the one or more second criteria. The method comprises: transmitting a first report message to a base station, triggered by fulfilment of one of the first and second criteria; responsive to transmission of the first report message, initiating the first or second timer associated with the one of the first and second criteria; and refraining from transmitting a further report message triggered by fulfilment of the one of the first and second criteria while the initiated first or second timer is active.

9 Claims, 16 Drawing Sheets

(56) References Cited

U.S. PATENT DOCUMENTS

| | | | | |
|---|---|---|---|---|
| 8,565,205 | B2* | 10/2013 | Ho | H04W 52/365 |
| | | | | 370/252 |
| 8,989,122 | B2* | 3/2015 | Anderson | H04W 72/0446 |
| | | | | 370/329 |
| 9,020,556 | B2* | 4/2015 | Haim | H04W 52/34 |
| | | | | 455/67.11 |
| 9,055,585 | B2* | 6/2015 | Lohr | H04L 5/0057 |
| 11,095,355 | B2* | 8/2021 | Cirik | H04L 1/1848 |
| 11,564,175 | B2* | 1/2023 | Ryoo | H04W 52/365 |
| 11,700,583 | B2* | 7/2023 | Loehr | H04W 72/23 |
| | | | | 370/329 |
| 11,743,843 | B2* | 8/2023 | Bontu | H04B 17/318 |
| | | | | 455/522 |
| 11,800,459 | B2* | 10/2023 | Papa | H04W 52/0206 |
| 11,805,489 | B2* | 10/2023 | Loehr | H04W 52/365 |
| 11,895,545 | B2* | 2/2024 | Da Silva | H04W 36/0058 |
| 11,917,559 | B2* | 2/2024 | Nadakuduti | H04B 1/3838 |
| 11,943,721 | B2* | 3/2024 | Jang | H04W 56/0015 |
| 12,028,813 | B2* | 7/2024 | Sun | H04W 52/365 |
| 2003/0093187 | A1* | 5/2003 | Walker | B64D 45/0059 |
| | | | | 701/1 |
| 2010/0317349 | A1* | 12/2010 | Serravalle | H04W 48/20 |
| | | | | 455/456.6 |
| 2012/0178494 | A1* | 7/2012 | Haim | H04W 52/365 |
| | | | | 455/522 |
| 2013/0010720 | A1* | 1/2013 | Lohr | H04W 52/30 |
| | | | | 370/329 |
| 2013/0044726 | A1* | 2/2013 | Shrivastava | H04L 1/1864 |
| | | | | 370/329 |
| 2013/0163534 | A1* | 6/2013 | Anderson | H04W 72/0446 |
| | | | | 370/329 |
| 2013/0163535 | A1* | 6/2013 | Anderson | H04W 72/04 |
| | | | | 370/329 |
| 2014/0018124 | A1 | 1/2014 | Ahn et al. | |
| 2019/0349061 | A1* | 11/2019 | Cirik | H04L 1/0026 |
| 2020/0145927 | A1 | 5/2020 | Sun et al. | |
| 2021/0029641 | A1* | 1/2021 | Khoshnevisan | H04L 1/1864 |
| 2021/0314883 | A1* | 10/2021 | Latheef | H04W 52/365 |
| 2022/0014985 | A1* | 1/2022 | Da Silva | H04W 36/00838 |
| 2023/0041095 | A1* | 2/2023 | Zhou | H04L 5/0057 |

FOREIGN PATENT DOCUMENTS

| | | |
|---|---|---|
| CN | 109964513 A | 7/2019 |
| JP | 2014509811 A | 4/2014 |

OTHER PUBLICATIONS

3GPP, "3GPP TS 36.213 V16.1.0", 3rd Generation Partnership Project; Technical Specification Group Radio Access Network; Evolved Universal Terrestrial Radio Access (E-UTRA); Physical layer procedures (Release 16), Mar. 2020, 1-570.

3GPP, "3GPP TS 38.101-1 V16.3.0", 3rd Generation Partnership Project; Technical Specification Group Radio Access Network; NR; User Equipment (UE) radio transmission and reception; Part 1: Range 1 Standalone (Release 16), Mar. 2020, 1-332.

3GPP, "3GPP TS 38.101-2 V16.3.1", 3rd Generation Partnership Project; Technical Specification Group Radio Access Network; NR; User Equipment (UE) radio transmission and reception; Part 2: Range 2 Standalone (Release 16), Mar. 2020, 1-170.

3GPP, "3GPP TS 38.101-3 V16.3.0", 3rd Generation Partnership Project; Technical Specification Group Radio Access Network; NR; User Equipment (UE) radio transmission and reception; Part 3: Range 1 and Range 2 Interworking operation with other radios (Release 16), Mar. 2020, 1-403.

3GPP, "3GPP TS 38.213 V16.1.0", 3rd Generation Partnership Project; Technical Specification Group Radio Access Network; NR; Physical layer procedures for control (Release 16), Mar. 2020, 1-156.

3GPP, "3rd Generation Partnership Project; Technical Specification Group Radio Access Network; Evolved Universal Terrestrial Radio Access (E-UTRA); Requirements for support of radio resource management (Release 16)", 3GPP TS 36.133 V16.5.0, Mar. 2020, 1-3641.

3GPP, "3rd Generation Partnership Project; Technical Specification Group Radio Access Network; NR; Radio Resource Control (RRC) protocol specification (Release 16)", 3GPP TS 38.331 V16.0.0, Mar. 2020, 1-835.

3GPP, "3rd Generation Partnership Project; Technical Specification Group Radio Access Network; NR; Requirements for support of radio resource management (Release 16)", 3GPP TS 38.133 V16.3.0, Mar. 2020, 1-1165.

Alcatel-Lucent, et al., "Discussion on PHR remaining issues", 3GPP TSG RAN WG2 Meeting #87, R2-143645, Dresden, Germany, Aug. 18-22, 2014, 1-4.

Apple Inc., "Further considerations on the uplink duty cycle enhancements for the MPE scenario", 3GPP RAN WG4 Meeting #93, R4-1913530, Reno, USA, Nov. 18-22, 2019, 1-10.

InterDigital, "Summary of MPE mitigation in FR2", R2-2006300, 3GPP RAN WG2 #110-e, Jun. 1-12, 2020.

Nokia, Nokia Shanghai Bell, "UE FR2 MPE enhancements and solutions", R2-2004906, 3GPP TSG-RAN WG2 Meeting #110-e, Elbonia, Jun. 1-11, 2020.

"Summary of MPE mitigation in FR2", 3GPP RAN WG2 Meeting #110-e; R2-2006300; InterDigital, Jun. 1-12, 2020, 1-16.

"[Draft] LS on MPE enhancements", TSG-RAN Working Group 4 (Radio) #94-e; R4-2002916; Online; Nokia, Nokia Shanghai Bell [to be RAN4]; Feb. 24-Mar. 6, 2020, 1 page.

* cited by examiner

| PH | Power Headroom Level |
|---|---|
|  |  |
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

Fig. 2

| $P_{CMAX,f,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

Fig. 3

| C₇ | C₆ | C₅ | C₄ | C₃ | C₂ | C₁ | R |
|---|---|---|---|---|---|---|---|
| C₁₅ | C₁₄ | C₁₃ | C₁₂ | C₁₁ | C₁₀ | C₉ | C₈ |
| C₂₃ | C₂₂ | C₂₁ | C₂₀ | C₁₉ | C₁₈ | C₁₇ | C₁₆ |
| C₃₁ | C₃₀ | C₂₉ | C₂₈ | C₂₇ | C₂₆ | C₂₅ | C₂₄ |
| P | V | PH (Type 2, SpCell of the other MAC entity) | | | | | |
| R | R | $P_{CMAX,f,c}$ 1 | | | | | |
| P | V | PH (Type 1, PCell) | | | | | |
| R | R | $P_{CMAX,f,c}$ 2 | | | | | |
| P | V | PH (Type X, Serving Cell 1) | | | | | |
| R | R | $P_{CMAX,f,c}$ 3 | | | | | |

...

| P | V | PH (Type X, Serving Cell n) |
|---|---|---|
| R | R | $P_{CMAX,f,c}$ m |

Fig. 5

REPORTING IN WIRELESS COMMUNICATION NETWORKS

TECHNICAL FIELD

Embodiments of the present disclosure relate to communication networks, and particularly to reporting in wireless communication networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In the NR (and LTE) MAC specifications there is a MAC Control Element (CE) called a power headroom report (PHR), which carries information relating to how much power a User Equipment (UE) has available for transmission. The PHR, transmitted by the UE to a serving base station, contains an indication of the amount of power headroom available at the UE for transmissions, i.e., the amount of power there is available at the UE in addition to the power being used for a current transmission.

The NR-version of this MAC CE is discussed below for both Single Entry and Multiple Entry PHR MAC CEs. Single Entry PHR MAC CEs report power headroom data for a single cell; Multiple Entry PHR MAC CEs report power headroom data for multiple cells.

For the Multi Entry PHR MAC CE, the first octet is a bit-map where each C-bit correspond to cells the UE is configured to use (also known as serving cells) and if the UE includes information for such a cell, the corresponding bit is set to 1, otherwise to 0. Following the first octet is a set of two-octet entries carrying the power headroom information for the cells included in the report. Each of those two-octet entries has a P-field, a V-field a PH-field, two R-bits (i.e. reserved bits, which can be used for future purposes) and a P_CMAX-field. The second octet in a two-octet entry is present only in some situations. The Single Entry PHR MAC CE is similar but contains power headroom information for only one cell. It has no P-field or V-field.

The following extracts are taken from 3GPP Technical Specification (TS) 38.321, v 16.0.0, and describe the Single Entry and Multiple Entry PHR MAC CEs in more detail.

Single Entry PHR MAC CE

The Single Entry PHR MAC CE is identified by a MAC subheader with LCID as specified in Table 6.2.1-2.

It has a fixed size and consists of two octets defined as follows (and shown in FIG. 1):

R: Reserved bit, set to 0;

Power Headroom (PH): This field indicates the power headroom level. The length of the field is 6 bits. The reported PH and the corresponding power headroom levels are shown in FIG. 2 (the corresponding measured values in dB are specified in TS 38.133);

$P_{CMAX,f,c}$: This field indicates the $P_{CMAX,f,c}$ (as specified in TS 38.213) used for calculation of the preceding PH field. The reported $P_{CMAX,f,c}$ and the corresponding nominal UE transmit power levels are shown in FIG. 3 (the corresponding measured values in dBm are specified in TS 38.133).

Multiple Entry PHR MAC CE

The Multiple Entry PHR MAC CE is identified by a MAC subheader with LCID as specified in Table 6.2.1-2.

It has a variable size, and includes the bitmap, a Type 2 PH field and an octet containing the associated $P_{CMAX,f,c}$ field (if reported) for SpCell of the other MAC entity, a Type 1 PH field and an octet containing the associated $P_{CMAX,f,c}$ field (if reported) for the PCell. It further includes, in ascending order based on the ServCellIndex, one or multiple of Type X PH fields and octets containing the associated $P_{CMAX,f,c}$ fields (if reported) for Serving Cells other than PCell indicated in the bitmap. X is either 1 or 3 according to TS 38.213 and TS 36.213.

The presence of Type 2 PH field for SpCell of the other MAC entity is configured by phr-Type2OtherCell with value true.

A single octet bitmap is used for indicating the presence of PH per Serving Cell when the highest ServCellIndex of Serving Cell with configured uplink is less than 8, otherwise four octets are used.

The MAC entity determines whether PH value for an activated Serving Cell is based on real transmission or a reference format by considering the configured grant(s) and downlink control information which has been received until and including the PDCCH occasion in which the first UL grant for a new transmission that can accommodate the MAC CE for PHR as a result of LCP as defined in clause 5.4.3.1 is received since a PHR has been triggered if the PHR MAC CE is reported on an uplink grant received on the PDCCH or until the first uplink symbol of PUSCH transmission minus PUSCH preparation time as defined in clause 7.7 of TS 38.213 if the PHR MAC CE is reported on a configured grant.

For a band combination in which the UE does not support dynamic power sharing, the UE may omit the octets containing Power Headroom field and $P_{CMAX,f,c}$ field for Serving Cells in the other MAC entity except for the PCell in the other MAC entity and the reported values of Power Headroom and $P_{CMAX,f,c}$ for the PCell are up to UE implementation.

The PHR MAC CEs are defined as follows:

$C_i$: This field indicates the presence of a PH field for the Serving Cell with ServCellIndex i as specified in TS 38.331. The $C_i$ field set to 1 indicates that a PH field for the Serving Cell with ServCellIndex i is reported. The $C_i$ field set to 0 indicates that a PH field for the Serving Cell with ServCellIndex i is not reported;

R: Reserved bit, set to 0;

V: This field indicates if the PH value is based on a real transmission or a reference format. For Type 1 PH, the V field set to 0 indicates real transmission on PUSCH and the V field set to 1 indicates that a PUSCH reference format is used. For Type 2 PH, the V field set to 0 indicates real transmission on PUCCH and the V field set to 1 indicates that a PUCCH reference format is used. For Type 3 PH, the V field set to 0 indicates real transmission on SRS and the V field set to 1 indicates that an SRS reference format is used. Furthermore, for Type 1, Type 2, and Type 3 PH, the V field set to 0 indicates the presence of the octet containing the associated $P_{CMAX,f,c}$ field, and the V field set to 1 indicates that the octet containing the associated $P_{CMAX,f,c}$ field is omitted;

Power Headroom (PH): This field indicates the power headroom level. The length of the field is 6 bits. The reported PH and the corresponding power headroom levels are shown in FIG. 2 (the corresponding measured values in dB for the NR Serving Cell are specified in TS 38.133 while the corresponding measured values in dB for the E-UTRA Serving Cell are specified in TS 36.133);

P: This field indicates whether the MAC entity applies power backoff due to power management (as allowed by P-MPR$_c$ as specified in TS 38.101-1, TS 38.101-2, and TS 38.101-3). The MAC entity shall set the P field to 1 if the corresponding $P_{CMAX,f,c}$ field would have had a different value if no power backoff due to power management had been applied;

$P_{CMAX,f,c}$: If present, this field indicates the $P_{CMAX,f,c}$ (as specified in TS 38.213) for the NR Serving Cell and the $P_{CMAX,c}$ or $\bar{P}_{CMAX,c}$ (as specified in TS 36.213) for the E-UTRA Serving Cell used for calculation of the preceding PH field. The reported $P_{CMAX,f,c}$ and the corresponding nominal UE transmit power levels are shown in FIG. 3 (the corresponding measured values in dBm for the NR Serving Cell are specified in TS 38.133 while the corresponding measured values in dBm for the E-UTRA Serving Cell are specified in TS 36.133).

MPE Enhancements

The Maximum Permissible Exposure (MPE) enhancements feature can be summarized as follows. There are regulatory requirements with regards to how much output power a UE can use. These requirements depend for example on the distance to a human body: if a user is very close to the antenna, the UE reduces the output transmission power it uses to ensure that the amount of energy the human body is exposed to is below a certain limit.

When the UE performs this type of power backoff, communication with the network is impacted since the amount of available output power at the UE is reduced. The network regularly configures the UE to perform transmissions using a certain transmission power. However, when MPE backoff is active, the UE will perform the transmission using a reduced output power, below the value configured by the network. It is beneficial for the network to be made aware of this unexpected backoff as this can be considered when configuring the UE with new transmission output power, or when scheduling the UE with a suitable number of resource blocks for its transmissions.

There currently exist certain challenge(s). If the UE sends a PHR MAC CE which includes an MPE indication, the UE will, according to current specifications, not be allowed to send another PHR MAC CE until a prohibit timer expires. If the MPE indication changes significantly, this means that the network does not receive that information since the UE will not be allowed to send a new PHR MAC CE to indicate the new value.

Certain aspects of the present disclosure and their embodiments may provide solutions to these or other challenges.

SUMMARY

According to some embodiments of the disclosure, the UE maintains two prohibit timers for the PHR MAC CE: one (new) prohibit timer which is associated with the MPE indications, and one (the existing one) which is narrowed so as not to apply for MPE indications.

There are, proposed herein, various embodiments which address one or more of the issues disclosed herein. For example, one embodiment provides a method performed by a wireless device for reporting to a base station. The wireless device is configured with one or more first criteria and one or more second criteria for triggering transmission of a report message, a first timer associated with the one or more first criteria, and a second timer associated with the one or more second criteria. The method comprises: transmitting a first report message to a base station, triggered by one of the first and second criteria; responsive to transmission of the first report message, initiating the first or second timer associated with the one of the first and second criteria; and refraining from transmitting a further report message triggered by the one of the first and second criteria while the initiated first or second timer is active.

Further aspects of the disclosure provide apparatus for performing the methods described herein.

Certain embodiments may provide one or more technical advantage(s), such as notifying the network of changes in MPE status even if a prohibit timer for transmission of a PHY MAC CE is active (i.e., running).

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 2 is a table showing reported PH and the corresponding power headroom levels;

FIG. 3 is a table showing reported $P_{CMAX,f,c}$ and the corresponding nominal UE transmit power levels;

FIG. 5 is a schematic diagram showing a Multiple Entry PHR MAC CE when the highest ServCellIndex of Serving Cell with configured uplink is equal to or higher than 8;

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

One aspect which is important for understanding some aspects of this disclosure is how the transmission of certain MAC CEs is modelled in the MAC specifications. The PHR MAC CE will be used as an example.

The PHR MAC CE can be "triggered". There are several triggers for the PHR MAC CE, for example a periodic timer expires, a determination is made that the pathloss has changed by more than a configured threshold, etc.

However, the triggering itself will not cause the UE to send a MAC CE. Instead, the UE has another process which, when there is an opportunity for sending a PHR MAC CE, determines if a PHR MAC CE has been triggered or not. If no PHR MAC CE has been triggered, the UE does not send the PHR MAC CE in such an opportunity. In this way, the UE only sends the PHR MAC CE when there is an opportunity and when a PHR MAC CE has been triggered. In this context, an opportunity for transmission may correspond to a PHR MAC CE being able to fit in to resources available for transmission, after higher priority data/indications have been included.

It should be noted that multiple triggers for a MAC CE may occur, but the UE sends only one MAC CE. One trigger is sufficient for transmission of the MAC CE. For example, if a timer for periodic PHR MAC CE reporting has expired and if the pathloss has changed more than a threshold, then there will be two triggers for the PHR MAC CE, but when the transmission opportunity comes, the UE only sends one PHR MAC CE.

It should further be noted that it is also possible to cancel PHR MAC CE triggers.

The present disclosure thus includes embodiments in which a wireless device (or UE) transmits, or refrains from transmitting, MAC CEs to a base station, particularly in the context of MAC CEs containing indications that MPE requirements have been applied in the UE, e.g., so as to limit the available transmit power, or other indications. One example scenario where this can be applied is where the MPE indication is carried in a PHR MAC CE. The PHR MAC CE contains several other indications, for example Power Headroom indications.

Figure 1:
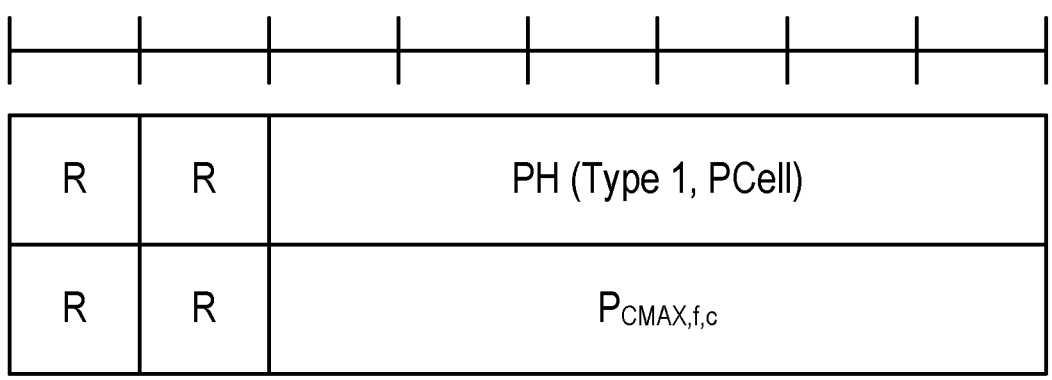
FIG. 1 is a schematic diagram illustrating a Single Entry PHR MAC CE.
Figure 4:
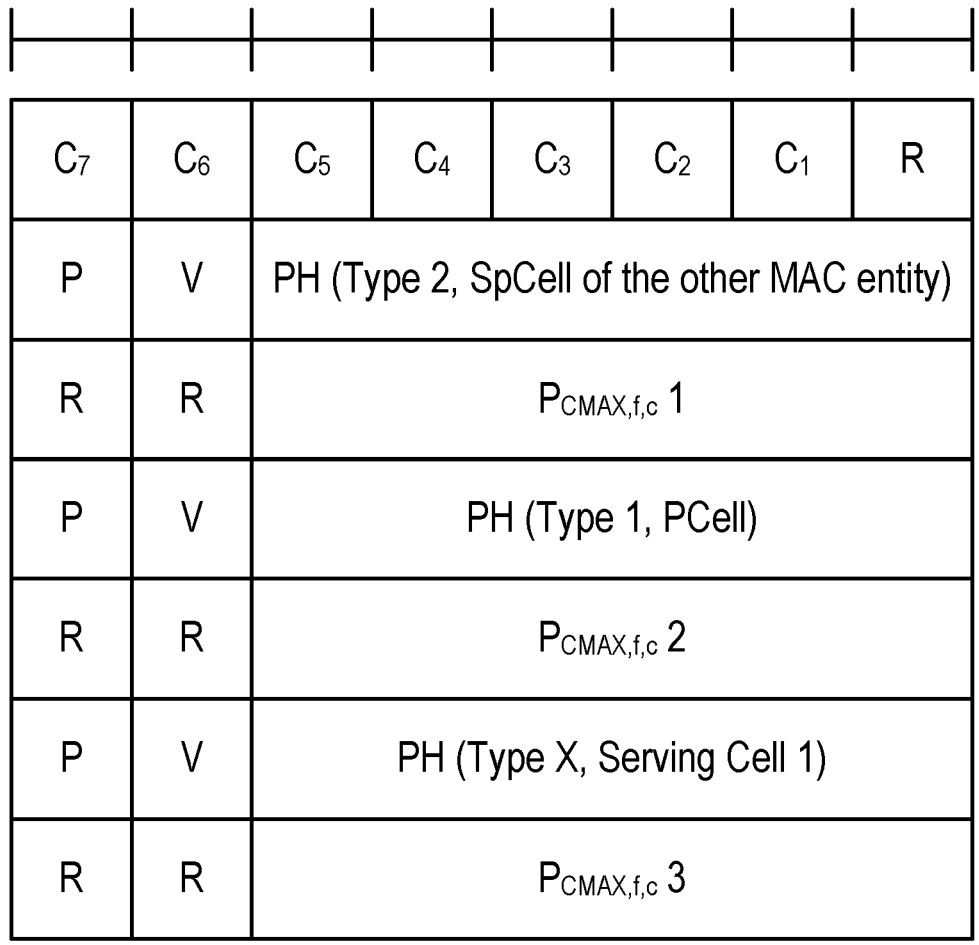
FIG. 4 is a schematic diagram showing a Multiple Entry PHR MAC CE when the highest ServCellIndex of Serving Cell with configured uplink is less than 8.
Figure 6:
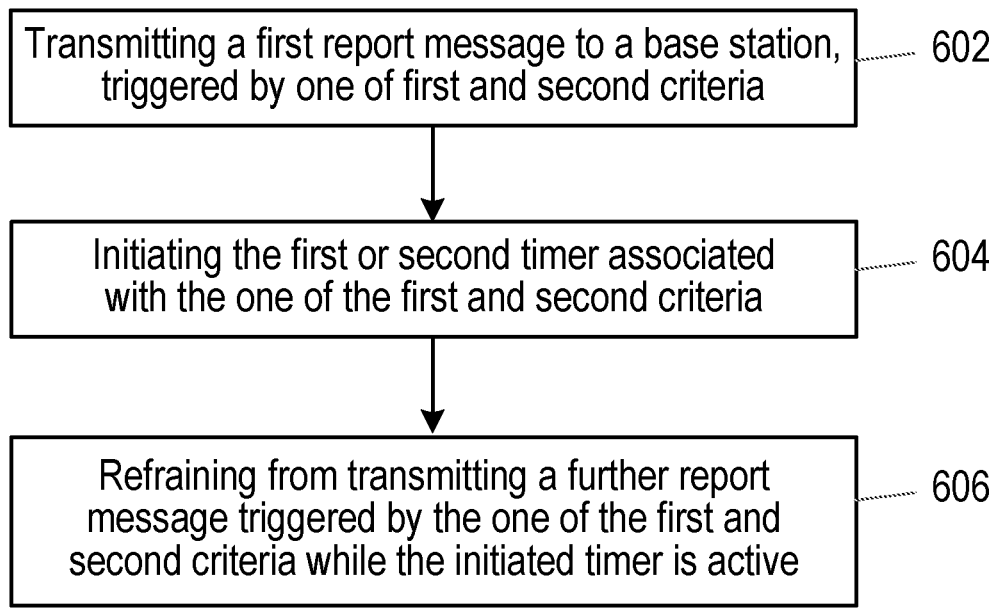
FIG. 6 is a flowchart of a method performed by a wireless device or UE in accordance with some embodiments.

FIG. 6 depicts a method in accordance with particular embodiments. The method may be performed by a wireless device or UE (such as the wireless device 710 or the UE 800 described below), or a virtual apparatus (such as apparatus 1600 described below). The method is for transmitting report messages to a base station (e.g., a base station, such as the network node 760 described below), and particularly describes circumstances in which the wireless device may refrain from transmitting a report message to the base station. Suitable report messages for application of the method include MAC CEs, and particularly those MAC CEs which may be adapted to contain one or more MPE indications. As used herein, MPE indications are indications that MPE requirements have been applied in the wireless device, e.g., such that an available transmit power in the wireless device is reduced owing to the regulations surrounding maximum permissible exposure. Possible MPE indications include an indication that the available transmit power (i.e., the power headroom) is reduced owing to MPE, and/or an indication of an amount by which the power headroom value (or, equivalently, the maximum output power) in the power headroom reports are reduced owing to power backoff (e.g., MPE). For example, a power headroom (PHR) MAC CE or other PHR message may contain one or more MPE indications. The indication of the amount by which the power headroom value is reduced owing to power backoff may comprise a value for the amount, or an index which maps to a corresponding amount. The mapping may be configured in the wireless device through transmissions from a base station, or hard-coded in the device.

The wireless device may be configured with one or more first criteria and one or more second criteria for triggering transmission of such a report message. The wireless device may be so configured through configuration messages from the base station (e.g., RRC messages, system information, etc), or the configuration may be hard-coded in the device, e.g., for compliance with a telecommunication standard.

The one or more first criteria may relate to MPE requirements implemented in the wireless device. For example, one first criterion may comprise activation of MPE requirements, e.g., to reduce the available transmit power at the wireless device. Thus, transmission of a report message may be triggered upon activation (or deactivation) of MPE requirements which reduce the available transmit power. Another first criterion may relate to a change in the amount by which the available transmit power is reduced owing to MPE requirements. For example, transmission of a report message may be triggered upon the amount by which the available transmit power is reduced owing to MPE requirements changing by more than a threshold amount. A further first criterion may relate to periodic reporting of MPE requirements to the base station. Thus a transmit timer may be initiated upon transmission of a report message containing an MPE indication (or upon transmission of a report message triggered by one of the one or more first criteria, e.g., for MPE reasons). Once the transmit timer expires, transmission of a further report message is triggered.

The one or more second criteria may relate to requirements other than MPE. The examples that follow relate particularly to triggers for transmission of a PHR message. However, those skilled in the art will appreciate that different criteria may apply for different report messages. For example, one second criterion may comprise the power headroom changing by more than a threshold amount (e.g., for non-MPE reasons). Another second criterion may relate to periodic reporting of PHR to the base station. Thus a transmit timer may be initiated upon transmission of a PHR message (e.g., for non-MPE reasons). Once the transmit timer expires, transmission of a further PHR message is triggered.

Where the wireless device is configured with multiple serving cells, different first and second criteria may apply in each serving cell. For example, the wireless device may be configured with different periods for transmission of the report messages, or different threshold values by which MPE indications or power headroom should change before triggering of the report messages.

According to embodiments of the disclosure, the wireless device is also configured with first and second timers, also called first and second prohibit timers herein. The first and second timers may apply to all serving cells of the wireless or, alternatively, the wireless device may be configured with first and second timers per serving cell. Again, the wireless device may be so configured through configuration messages from the base station (e.g., RRC messages, system information, etc), or the configuration may be hard-coded in the device, e.g., for compliance with a telecommunication standard.

The first timer is associated with the one or more first criteria and, while active (e.g., running), acts to prohibit transmission of report messages which were triggered by the one or more first criteria. In some embodiments, the first timer acts to prohibit transmission of report messages which were triggered only by the one or more first criteria. Thus, if a report message was triggered by both first and second criteria, transmission of the report message would not be prohibited. The second timer is associated with the one or more second criteria and, while active, acts to prohibit transmission of report messages triggered by the one or more second criteria. Again, in some embodiments, the second timer acts to prohibit transmission of report messages which were triggered only by the one or more second criteria. Thus, if a report message was triggered by both first and second criteria, transmission of the report message would not be prohibited.

The method begins in step 602, in which the wireless device transmits a first report message to a base station (e.g., a serving base station, such as network node 760 described below). The transmission of the first report message is triggered by one of the first and second criteria.

In step 604, the wireless device initiates the timer which is associated with the criteria which triggered the first report message. If one or more of the first criteria triggered transmission of the first report message, the first timer is initiated (e.g., started or restarted); if one or more of the second criteria triggered transmission of the first report message, the second timer is initiated; if both the first and second criteria triggered transmission of the first report message, the first and second timers are both initiated.

In one embodiment, the first timer may additionally or alternatively be initiated responsive to a determination that a value for an MPE indication in the first report message differs from a value for that MPE indication in the immediately preceding (i.e., the most recent previous) report message. It will be described below how a report message may contain an MPE indication whether or not the report message was triggered by a first criterion. If that MPE indication differs from an MPE indication in the previous report message (e.g., by more than a threshold amount), the first timer may be initiated.

In step 606, while the initiated timer is active (i.e., running), the wireless device refrains from transmitting a further report message triggered by the same criteria as the first report message. Thus, while the first timer is active, the wireless device refrains from transmitting a further report message triggered by the one or more first criteria. While the second timer is active, the wireless device refrains from transmitting a further report message triggered by the one or more second criteria.

The wireless device may refrain from transmitting the further report message in a number of different ways. For example, the wireless device may refrain from triggering the report message. Thus the report message is never triggered or transmitted. Another approach is that the report message is triggered, but the wireless device refrains from acting on the trigger and hence the triggered report message is not transmitted. Yet another approach is that the wireless device triggers the report message, and the wireless device acts on the triggering (e.g., by assigning the triggered report message to a data packet for transmission), but then when the triggered report message should be transmitted the wireless device determines if it should be sent or not. If not, the wireless device can abort the transmission. Yet another approach is that the wireless device defers transmitting the report message to a later time.

In some embodiments, the wireless device may refrain from transmitting a further report message triggered only by the same criteria as the first report message. Thus, where a further report message is transmitted by both first and second criteria, but only one of the first and second timers is active, the wireless device may transmit the further report message.

Where the first timer is active but the second timer is inactive, for example, the wireless device may thus transmit a further report message triggered by one or more second criteria. Nonetheless, in some embodiments, the wireless device may include an MPE indication in the further report message even though the first timer is active. The MPE indication may be an up-to-date value for the MPE indication (i.e., the wireless device may re-determine the value for the MPE indication since a previous or most-recent transmission of the MPE indication), or the MPE indication may correspond to the value contained in a previous or most-recent transmission of the MPE indication. For example, an up-to-date value for the MPE indication may be included responsive to a determination that one or more of the first criteria are met (i.e., that the further report message has been triggered by the first criteria, even though the first timer is active).

As noted above, the wireless device may be configured to transmit MPE indications for each serving cell, and may be configured with respective first timers per serving cell. In this case, while the first timer for a certain serving cell (called "first serving cell") is running, the wireless device refrains from transmitting a report message triggered by the one or more first criteria for the first serving cell.

However, a further report message may be transmitted if triggered by the one or more first criteria in another serving cell (called "second serving cell") for which the first timer is not active. Thus the further report message may be transmitted, containing an MPE indication in respect of the second serving cell. Nonetheless, however, the further report message may also comprise an MPE indication for the first serving cell (and notwithstanding the active first timer for the first serving cell). The MPE indication for the first serving cell may be an up-to-date value for the MPE indication (i.e., the wireless device may re-determine the value for the MPE indication for the first serving cell since a previous or most-recent transmission of the MPE indication), or the MPE indication may correspond to the value for the first serving cell contained in a previous or most-recent transmission of the MPE indication. For example, an up-to-date value for the MPE indication may be included responsive to a determination that one or more of the first criteria are met in the first serving cell (i.e., that the further report message has been triggered by the first criteria in the first serving cell, even though its respective first timer is active).

The first timer for the second serving cell in this scenario is initiated upon transmission of the further report message and, if the further report message is triggered by first criteria for multiple serving cells, the respective first timers for those serving cells are initiated upon transmission of the further report message. In one embodiment, the first timer for the first serving cell in this scenario is not restarted upon transmission of the further report message. Alternatively, the first timer for the first serving cell may be restarted only if an up-to-date value of the MPE indication for the first serving cell is included in the further report message.

Figure 7:
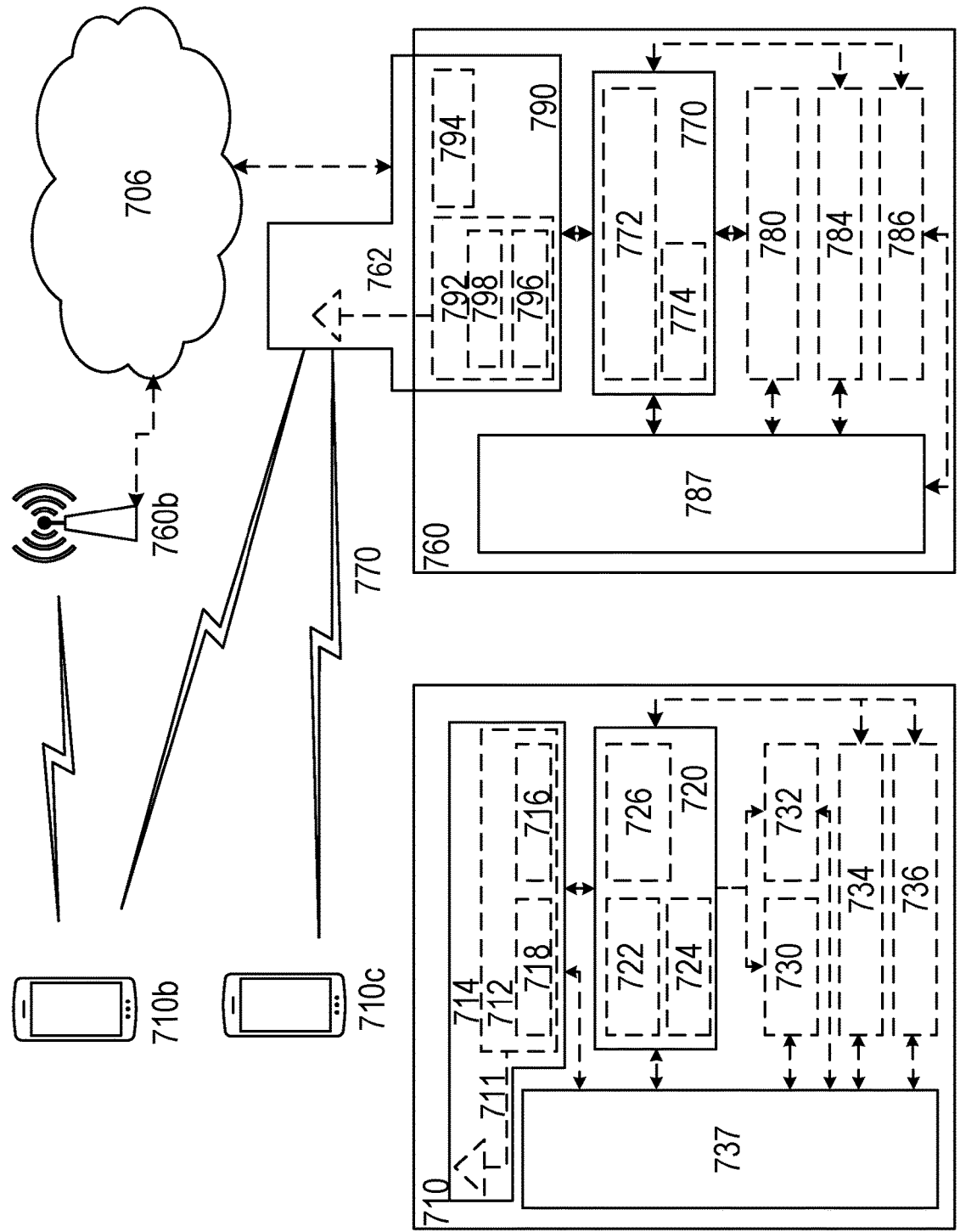
FIG. 7 is a schematic diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760b, and WDs 710, 710b, and 710c. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, WCDMA, LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units.

In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760, but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signalling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments apart of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered apart of interface 790. Instill other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720, and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a WD may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into WD 710, and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network, and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

Figure 8:
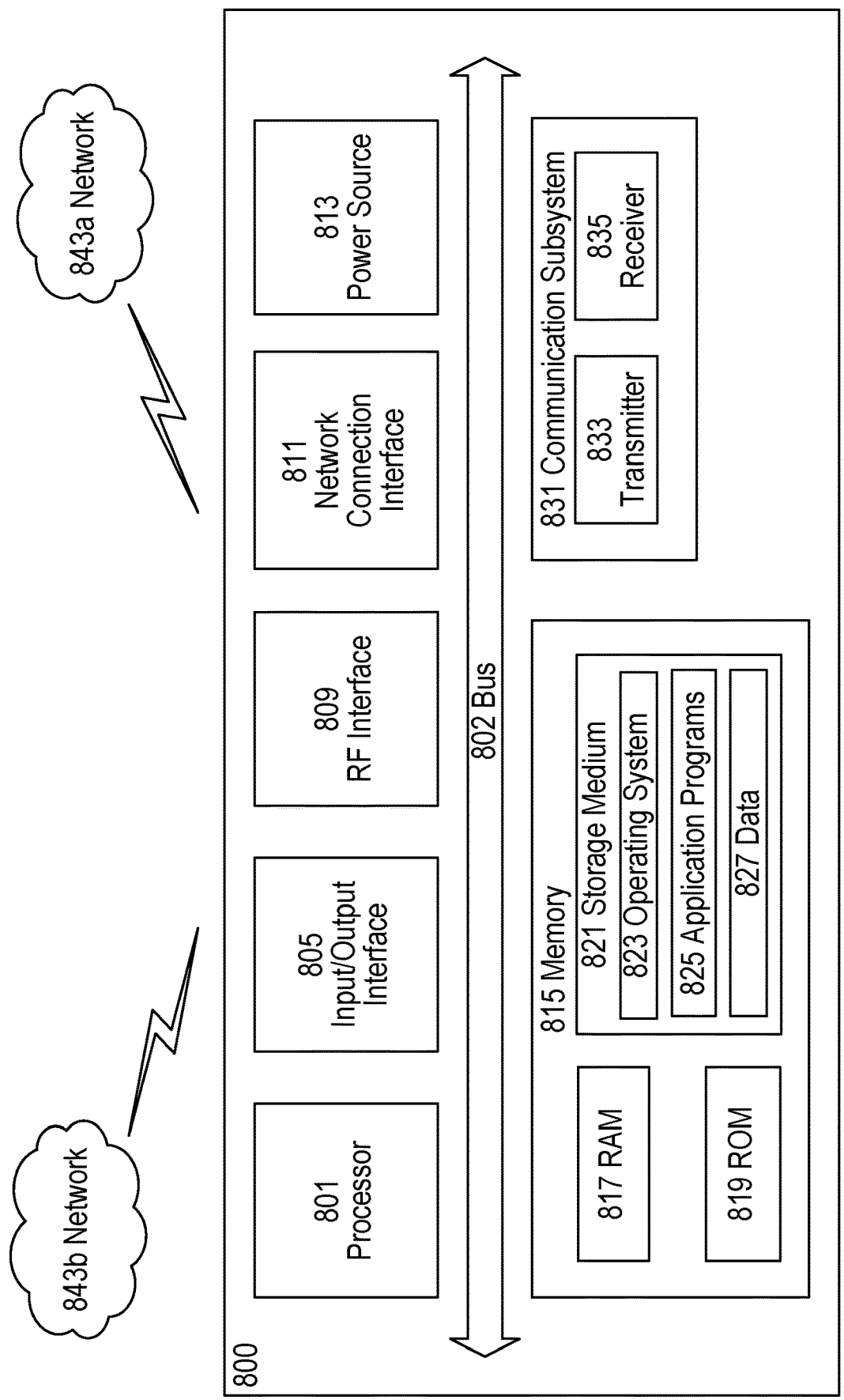
FIG. 8 is a schematic diagram of a user equipment in accordance with some embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 800 may be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843*a*. Network 843*a* may encompass wired and/or wireless networks such as a local-area network (LAN), a wide-area network (WAN), a computer network, a wireless network, a telecommunications network, another like network or any combination thereof. For example, network 843*a* may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843*b* using communication subsystem 831. Network 843*a* and network 843*b* may be the same network or networks or different network or networks. Communication subsystem 831 may be configured to include one or more transceivers used to communicate with network 843*b*. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843*b* may encompass wired and/or wireless networks such as a local-area network (LAN), a wide-area network (WAN), a computer network, a wireless network, a telecommunications network, another like network or any combination thereof. For example, network 843*b* may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
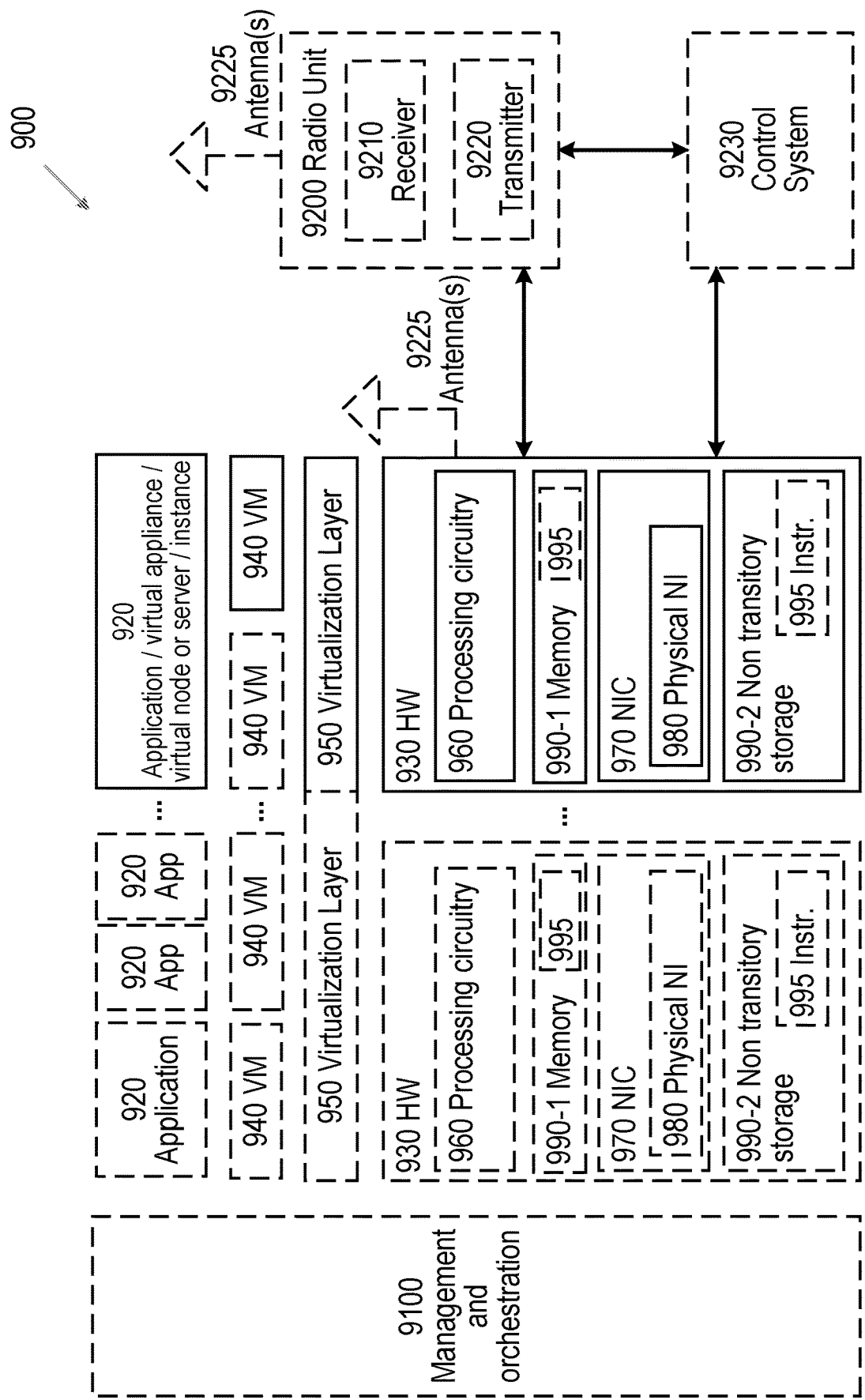
FIG. 9 is a schematic diagram of a virtualization environment in accordance with some embodiments.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signalling can be effected with the use of control system 9230 which may alternatively be used for communication between the hardware nodes 930 and radio units 9200.

Figure 10:
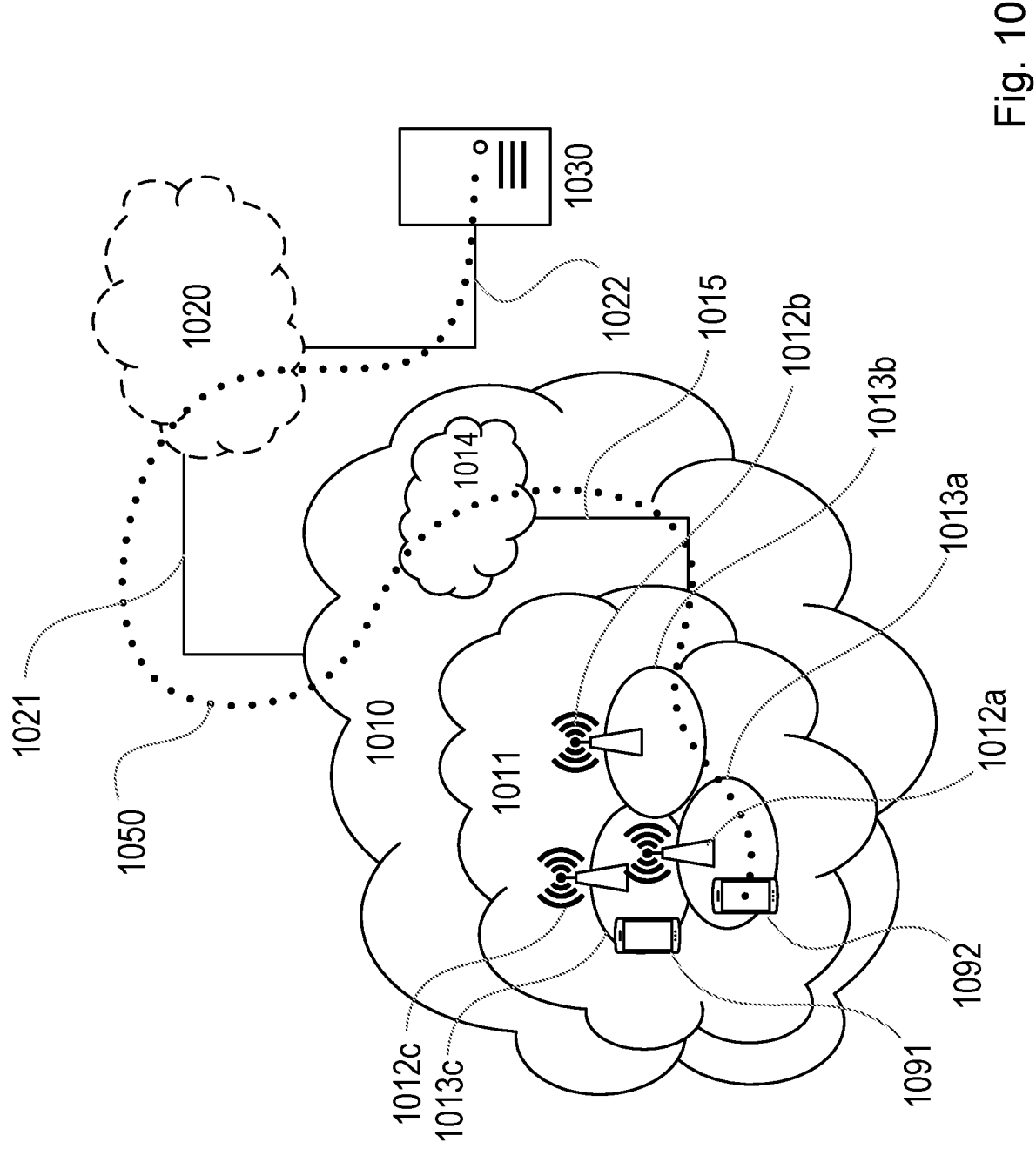
FIG. 10 schematically illustrates a telecommunication network connected via an intermediate network to a host computer in accordance with some embodiments.

With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to setup and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 11:
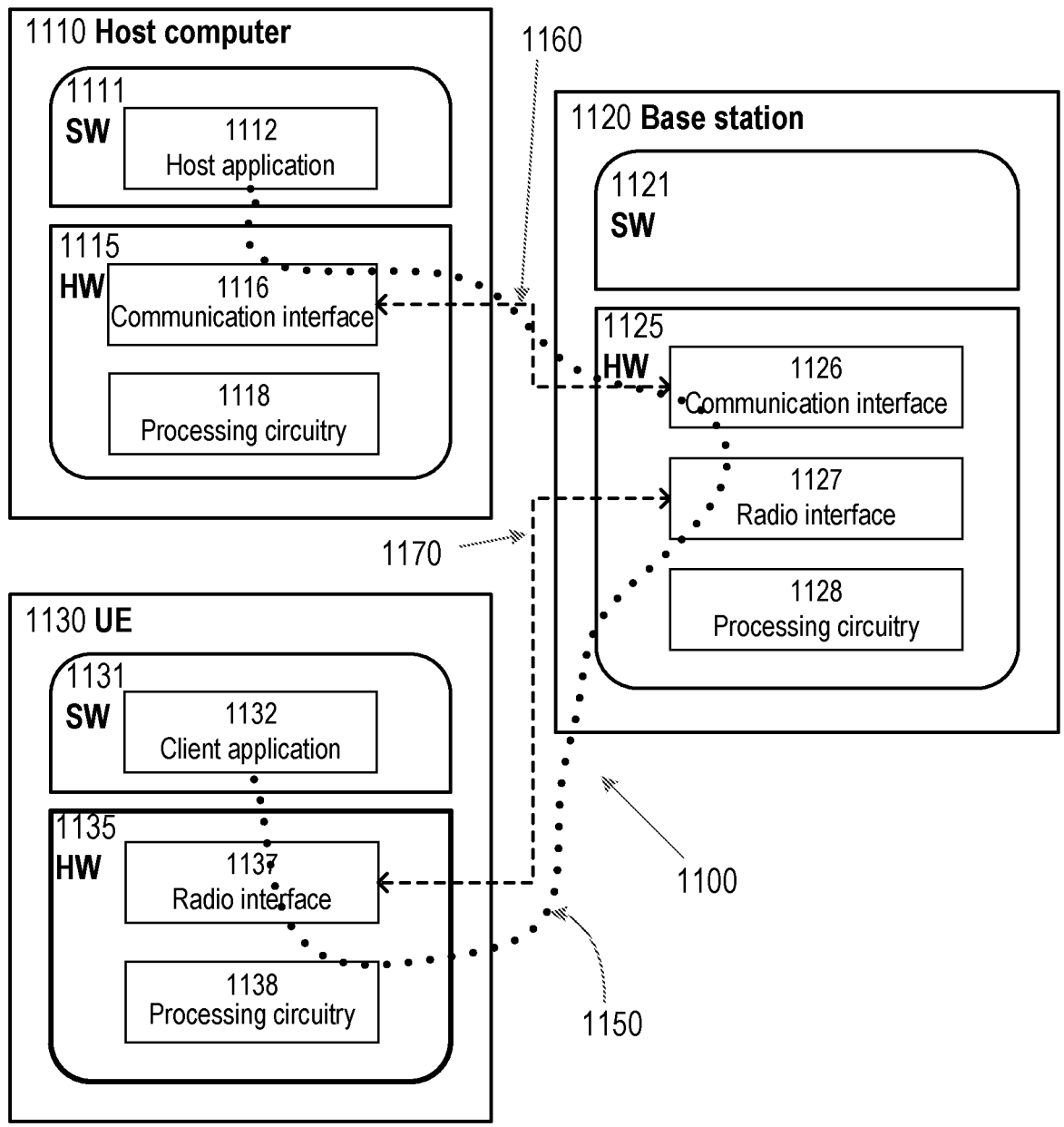
FIG. 11 schematically illustrates a host computer communicating via a base station with a user equipment over a partially wireless connection in accordance with some embodiments.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the reporting of power headroom and thus enable more accurate (appropriate) scheduling of resource blocks for uplink transmissions. Such embodiments may thereby provide benefits such as a more stable OTT connection 1150.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
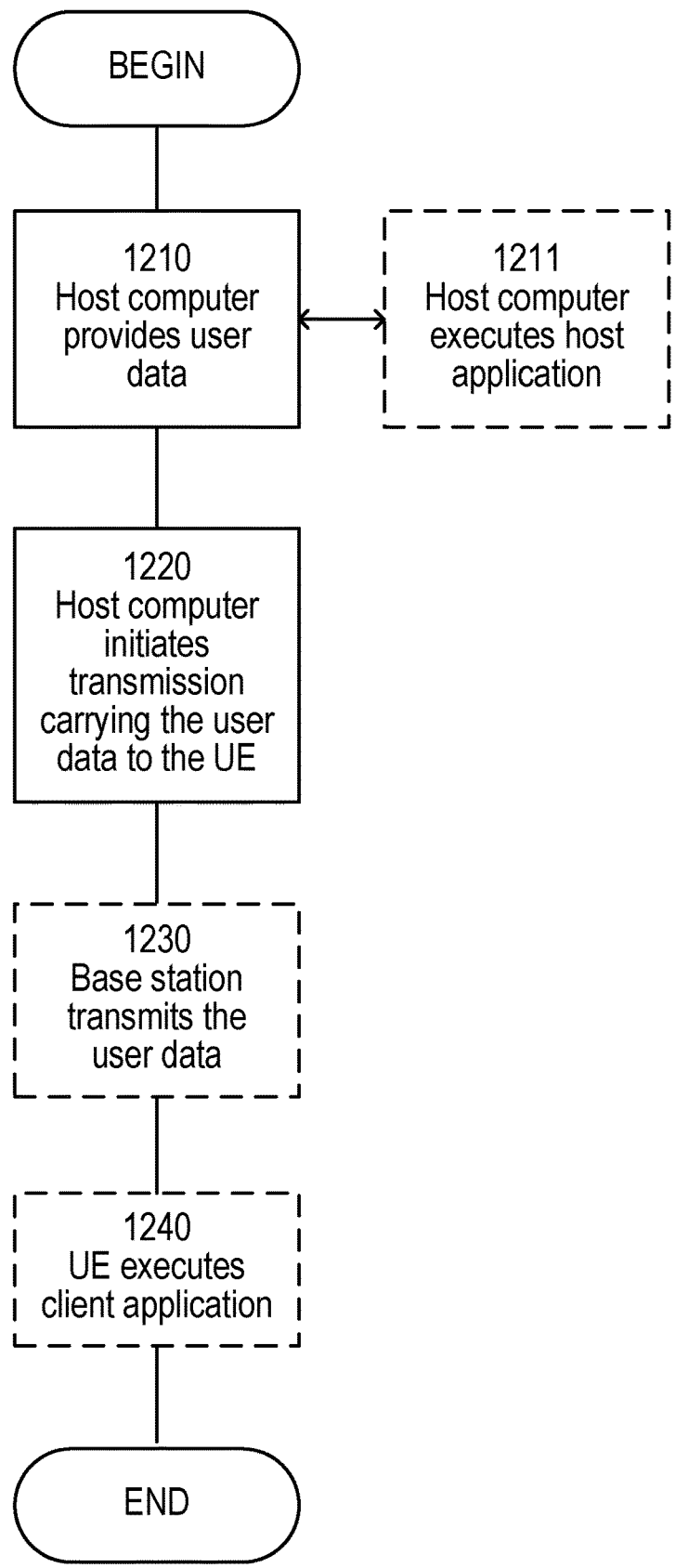
FIGS. 12-15 are flowcharts illustrating methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
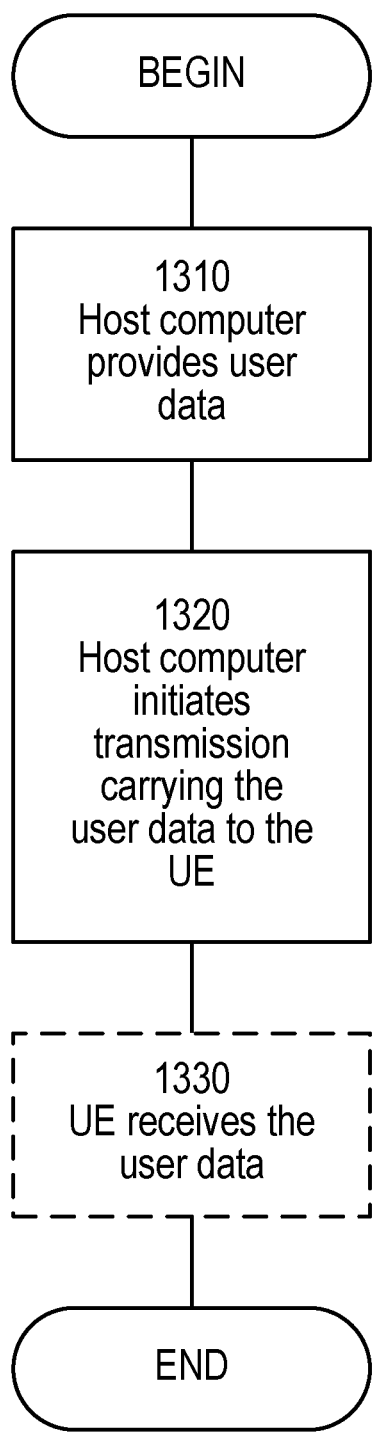

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
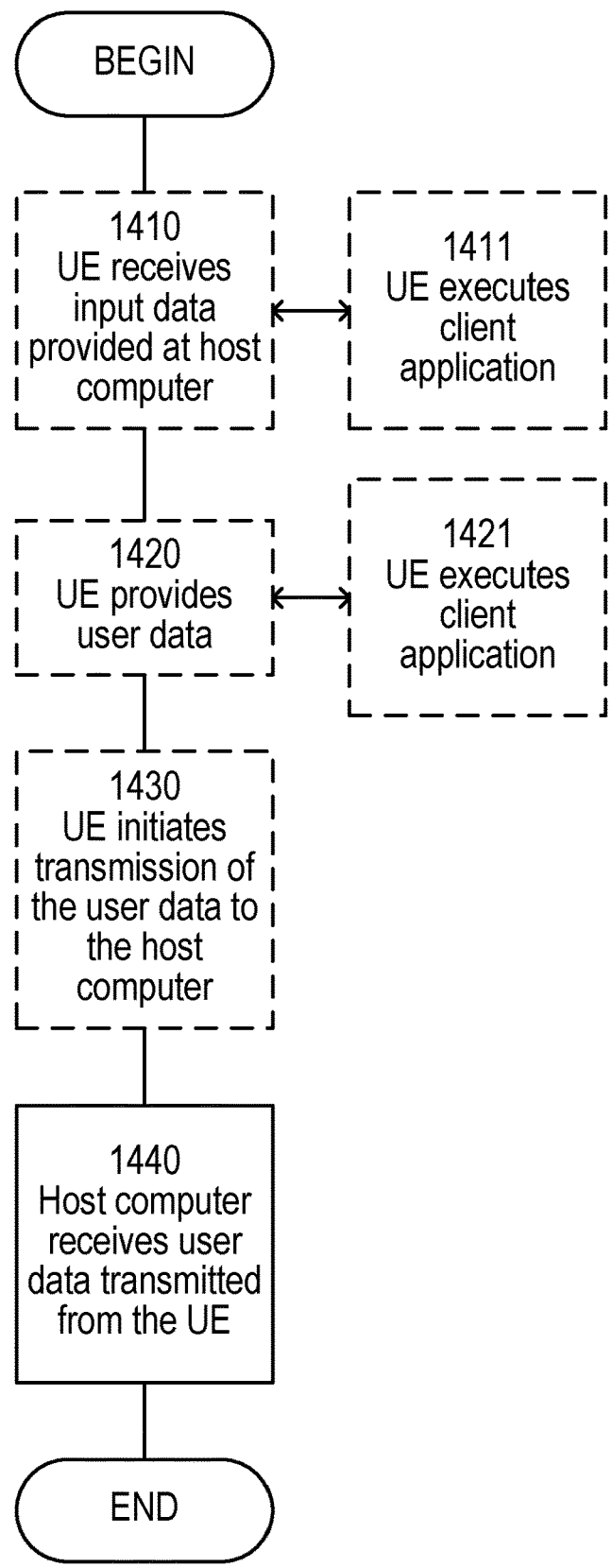

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
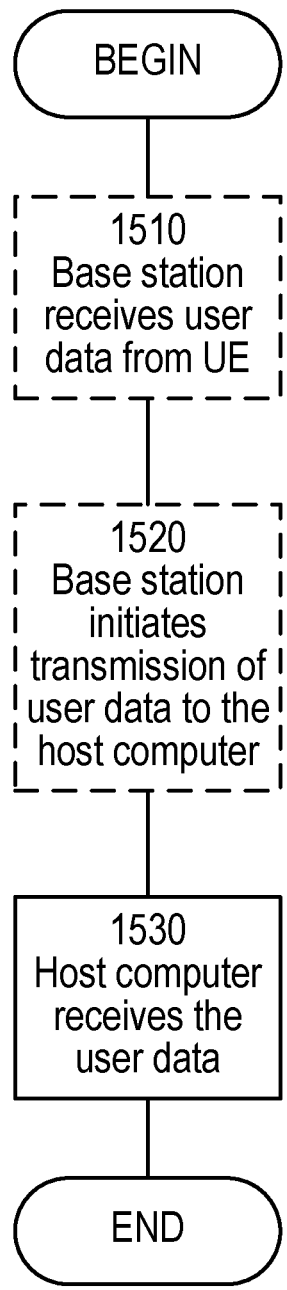

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Figure 16:
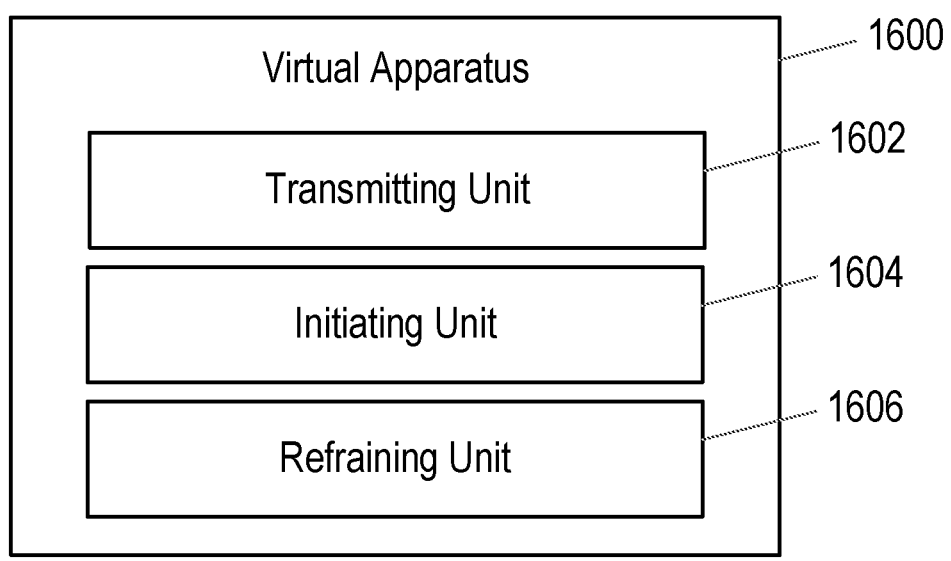
FIG. 16 is a schematic diagram showing a virtualization apparatus in accordance with some embodiments.

FIG. 16 illustrates a schematic block diagram of an apparatus 1600 in a wireless network (for example, the wireless network shown in FIG. 7). The apparatus may be implemented in a wireless device or network node (e.g., wireless device 710 or network node 760 shown in FIG. 7). Apparatus 1600 is operable to carry out the example method described with reference to FIG. 6 and possibly any other processes or methods disclosed herein. It is also to be understood that the method of FIG. 6 is not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 1602, initiating unit 1604, refraining unit 1606, and any other suitable units of apparatus 1600 to perform corresponding functions according one or more embodiments of the present disclosure.

The apparatus 1600 is configured with one or more first criteria and one or more second criteria for triggering transmission of a report message, a first timer associated with the one or more first criteria, and a second timer associated with the one or more second criteria. As illustrated in FIG. 16, apparatus 1600 includes transmitting unit 1602, initiating unit 1604 and refraining unit 1606. Transmitting unit 1602 is configured to transmit a first report message to a base station, triggered by one of the first and second criteria. Initiating unit 1604 is configured to initiate, responsive to transmission of the first report message, the first or second timer associated with the one of the first and second criteria. Refraining unit 1606 is configured to refrain from transmitting a further report message triggered by the one of the first and second criteria while the initiated first or second timer is active.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. For the avoidance of doubt, the following statements set out embodiments of the disclosure.

GROUP A EMBODIMENTS

1. A method performed by a wireless device for reporting to a base station, the wireless device being configured with one or more first criteria and one or more second criteria for triggering transmission of a report message, a first timer associated with the one or more first criteria, and a second timer associated with the one or more second criteria, the method comprising:
   transmitting a first report message to a base station, triggered by one of the first and second criteria;
   responsive to transmission of the first report message, initiating the first or second timer associated with the one of the first and second criteria; and
   refraining from transmitting a further report message triggered by the one of the first and second criteria while the initiated first or second timer is active.
2. The method of embodiment 1, wherein transmission of the first report message is triggered by one of the one or more first criteria, and further comprising, responsive to detection of one or more of the second criteria while the first timer is active, transmitting a further report message to the base station.

3. The method of embodiment 2, wherein the first report message comprises one or more of: an indication that transmit power of the wireless device is reduced owing to maximum permissible exposure, MPE, requirements; and an indication of an amount by which transmit power of the wireless device is reduced owing to MPE requirements.
4. The method of embodiment 3, wherein the first timer is initiated further responsive to a determination that the indication that transmit power of the wireless device is reduced owing to MPE requirements, in the first report message, is different to an indication that transmit power of the wireless device is reduced owing to MPE requirements, in a previous report message.
5. The method of embodiment 3 or 4, wherein the first timer is initiated further responsive to a determination that the amount by which transmit power of the wireless device is reduced owing to MPE requirements, in the first report message, is different to an amount by which transmit power of the wireless device is reduced owing to MPE requirements, in a previous report message.
6. The method of any one of embodiments 2 to 5, wherein the further report message comprises one or more of: an indication that transmit power of the wireless device is reduced owing to MPE requirements; and an indication of an amount by which transmit power of the wireless device is reduced owing to MPE requirements.
7. The method of any preceding embodiment, wherein the one or more first criteria relate to a requirement to report reduction in transmit power owing to power backoff.
8. The method of any preceding embodiment, wherein the one or more first criteria relate to a requirement to report maximum permissible exposure, MPE, indications.
9. The method of embodiment 8, wherein the MPE indications comprise one or more of: an indication that transmit power of the wireless device is reduced owing to MPE requirements; and an indication of an amount by which transmit power of the wireless device is reduced owing to MPE requirements.
10. The method of any preceding embodiment, wherein the one or more second criteria relate to reporting requirements other than MPE requirements.
11. The method of any preceding embodiment, wherein the wireless device is configured with respective first and second timers for each serving cell.
12. The method of any preceding embodiment, wherein the wireless device refrains from transmitting a further report message by refraining from triggering the further report message.
13. The method of any one of embodiments 1 to 11, wherein the wireless device refrains from transmitting a further report message by refraining from acting upon a trigger for transmission of the further report message.
14. The method of any one of embodiments 1 to 11, wherein the wireless device refrains from transmitting a further report message by aborting transmission of the further report message.
15. The method of any one of embodiments 1 to 11, wherein the wireless device refrains from transmitting a further report message by deferring transmission of the further report message.
16. The method of any preceding embodiment, wherein the report message comprises a medium access control, MAC, control element, CE.
17. The method of any preceding embodiment, wherein the report message comprises a power headroom report.
18. The method of any of the previous embodiments, further comprising:
providing user data; and
forwarding the user data to a host computer via the transmission to the base station.

GROUP B EMBODIMENTS

19. A wireless device, the wireless device comprising:
processing circuitry configured to cause the wireless device to perform any of the steps of any of the Group A embodiments; and
power supply circuitry configured to supply power to the wireless device.
20. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to cause the UE to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
21. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.
22. The communication system of the previous embodiment, wherein the cellular network further includes a base station configured to communicate with the UE.
23. The communication system of the previous 2 embodiments, wherein:
the processing circuitry of the host computer is configured to execute a host application, thereby providing the user data; and
the UE's processing circuitry is configured to execute a client application associated with the host application.
24. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

25. The method of the previous embodiment, further comprising at the UE, receiving the user data from the base station.
26. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.
27. The communication system of the previous embodiment, further including the UE.
28. The communication system of the previous 2 embodiments, further including the base station, wherein the base station comprises a radio interface configured to communicate with the UE and a communication interface configured to forward to the host computer the user data carried by a transmission from the UE to the base station.
29. The communication system of the previous 3 embodiments, wherein:
the processing circuitry of the host computer is configured to execute a host application; and
the UE's processing circuitry is configured to execute a client application associated with the host application, thereby providing the user data.
30. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.
31. A method implemented in a communication system including a host computer, a base station and a user equipment (UE), the method comprising:
at the host computer, receiving user data transmitted to the base station from the UE, wherein the UE performs any of the steps of any of the Group A embodiments.
32. The method of the previous embodiment, further comprising, at the UE, providing the user data to the base station.
33. The method of the previous 2 embodiments, further comprising:
at the UE, executing a client application, thereby providing the user data to be transmitted; and
at the host computer, executing a host application associated with the client application.
34. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.
35. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.
36. The method of the previous embodiment, further comprising at the base station, receiving the user data from the UE.
37. The method of the previous 2 embodiments, further comprising at the base station, initiating a transmission of the received user data to the host computer.

APPENDIX

Below are a few examples illustrating how some aspects of the disclosure can be implemented in the NR MAC specification (3GPP TS 38.321 v16.0.0).
The changes are shown with change-marks.

Example A

In Example A, the UE maintains one mpe-ProhibitTimer which is common for all serving cells. If the timer has expired and the MPE value has changed at least more than a configured threshold, the UE will trigger a PHR MAC CE which includes the MPE indication.
When sending the MAC CE, the UE always starts the mpe-ProhibitTimer and the phr-ProhibitTimer regardless of what triggered the PHR MAC CE.
Beginning of example implementation
5.4.6 Power Headroom Reporting
The Power Headroom reporting procedure is used to provide the serving gNB with the following information:
Type 1 power headroom: the difference between the nominal UE maximum transmit power and the estimated power for UL-SCH transmission per activated Serving Cell;
Type 2 power headroom: the difference between the nominal UE maximum transmit power and the estimated power for UL-SCH and PUCCH transmission on SpCell of the other MAC entity (i.e. E-UTRA MAC entity in EN-DC, NE-DC, and NGEN-DC cases);
Type 3 power headroom: the difference between the nominal UE maximum transmit power and the estimated power for SRS transmission per activated Serving Cell.
RRC controls Power Headroom reporting by configuring the following parameters:
phr-PeriodicTimer;
phr-ProhibitTimer;
phr-Tx-PowerFactorChange;
phr-Type2OtherCell,
phr-ModeOtherCG;
multiplePHR
mpe-ProhibitTimer.
A Power Headroom Report (PHR) shall be triggered if any of the following events occur:
phr-ProhibitTimer expires or has expired and the path loss has changed more than phr-Tx-PowerFactorChange dB for at least one activated Serving Cell of any MAC entity which is used as a pathloss reference since the last transmission of a PHR in this MAC entity when the MAC entity has UL resources for new transmission;
NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between.

mpe-ProhibitTimer expires or has expired and the MPE indication has changed more than mpe-ReportThreshold dB for at least one activated Serving Cell of any MAC entity since the last transmission of a PHR in this MAC entity when the MAC entity has UL resources for new transmission;

phr-PeriodicTimerexpires;

upon configuration or reconfiguration of the power headroom reporting functionality by upper layers, which is not used to disable the function;

activation of an SCell of any MAC entity with configured uplink;

addition of the PSCell (i.e. PSCell is newly added or changed);

phr-ProhibitTimer expires or has expired, when the MAC entity has UL resources for new transmission, and the following is true for any of the activated Serving Cells of any MAC entity with configured uplink:

there are UL resources allocated for transmission or there is a PUCCH transmission on this cell, and the required power backoff due to power management (as allowed by P-MPR$_c$ as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.

NOTE 2: The MAC entity should avoid triggering a PHR when the required power backoff due to power management decreases only temporarily (e.g. for up to a few tens of milliseconds) and it should avoid reflecting such temporary decrease in the values of $P_{CMAX,f,c}$/PH when a PHR is triggered by other triggering conditions.

If the MAC entity has UL resources allocated for a new transmission the MAC entity shall:

1> if it is the first UL resource allocated for a new transmission since the last MAC reset:
   2> start phr-PeriodicTimer;
1> if the Power Headroom reporting procedure determines that at least one PHR has been triggered and not cancelled; and
1> if the allocated UL resources can accommodate the MAC CE for PHR which the MAC entity is configured to transmit, plus its subheader, as a result of LCP as defined in clause 5.4.3.1:
   2> if multiplePHR with value true is configured:
      3> for each activated Serving Cell with configured uplink associated with any MAC entity:
         4> obtain the value of the Type 1 or Type 3 power headroom for the corresponding uplink carrier as specified in clause 7.7 of TS 38.213 [6];
         4> if this MAC entity has UL resources allocated for transmission on this Serving Cell; or
         4> if the other MAC entity, if configured, has UL resources allocated for transmission on this Serving Cell and phr-ModeOtherCG is set to real by upper layers:
            5> obtain the value for the corresponding $P_{CMAX,f,c}$ field from the physical layer
            5> if includeMPE is set to true:
               6> if the PHR was triggered due to expiry of phr-MPE-PeriodicTimer
                  7> obtain the value for the corresponding MPE field from the physical layer;
               6> else:
                  7> apply the most recent value reported from physical layer as the value for the corresponding MPE field.
      3> if phr-Type2OtherCell with value true is configured:
         4> if the other MAC entity is E-UTRA MAC entity:
            5> obtain the value of the Type 2 power headroom for the SpCell of the other MAC entity (i.e. E-UTRA MAC entity);
            5> if phr-ModeOtherCG is set to real by upper layers:
               6> obtain the value for the corresponding $P_{CMAX,f,c}$ field for the SpCell of the other MAC entity (i.e. E-UTRA MAC entity) from the physical layer.
      3> instruct the Multiplexing and Assembly procedure to generate and transmit the Multiple Entry PHR MAC CE as defined in clause 6.1.3.9 based on the values reported by the physical layer.
   2> else (i.e. Single Entry PHR format is used):
      3> obtain the value of the Type 1 power headroom from the physical layer for the corresponding uplink carrier of the PCell;
      3> obtain the value for the corresponding $P_{CMAX,f,c}$ field from the physical layer;
      3> if includeMPE is set to true:
         4> obtain the value for the corresponding MPE field from the physical layer
      3> instruct the Multiplexing and Assembly procedure to generate and transmit the Single Entry PHR MAC CE as defined in clause 6.1.3.8 based on the values reported by the physical layer.
   2> start or restart phr-Periodic Timer;
   2> start or restart mpe-ProhibitTimer;
   2> start or restart phr-ProhibitTimer;
   2> cancel all triggered PHR(s).
End of example implementation Example B Example B is similar to Example A, but the UE only starts the mpe-ProhibitTimer if the UE sends a PHR MAC CE due to a trigger for MPE reasons, e.g., that the MPE indication has changed by more than a threshold. The phr-ProhibitTimer (referred to as the general-timer) is only started by the UE if the PHR MAC CE was triggered for non-MPE reasons. Note the reason why there is not an if-else-clause used in the below for the part where timers are started is that both may be true, i.e. the PHR MAC CE may have been started both due to MPE-reasons and due to non-MPE-reasons, and an if-else-clause would make the UE start only one of these timers, while the intention of this example implementation is that the UE should be able to start both.

One notable difference between Example B and Example A is therefore that the mpe-ProhibitTimer is started or restarted if the PHR was triggered (at least) due to a change of the MPE indication, while the phr-ProhibitTimer is started or restarted if the PHR was not triggered (at least) due to a change of the MPE indication).

Beginning of example implementation 5.4.6 Power Headroom Reporting

The Power Headroom reporting procedure is used to provide the serving gNB with the following information:

Type 1 power headroom: the difference between the nominal UE maximum transmit power and the estimated power for UL-SCH transmission per activated Serving Cell;

Type 2 power headroom: the difference between the nominal UE maximum transmit power and the estimated power for UL-SCH and PUCCH transmission on SpCell of the other MAC entity (i.e. E-UTRA MAC entity in EN-DC, NE-DC, and NGEN-DC cases);

Type 3 power headroom: the difference between the nominal UE maximum transmit power and the estimated power for SRS transmission per activated Serving Cell.

RRC controls Power Headroom reporting by configuring the following parameters:
  phr-PeriodicTimer;
  phr-ProhibitTimer;
  phr-Tx-PowerFactorChange;
  phr-Type2OtherCell;
  phr-ModeOtherCG;
  multiplePHR
  mpe-ProhibitTimer.

A Power Headroom Report (PHR) shall be triggered if any of the following events occur:
  phr-ProhibitTimer expires or has expired and the path loss has changed more than phr-Tx-PowerFactorChange dB for at least one activated Serving Cell of any MAC entity which is used as a pathloss reference since the last transmission of a PHR in this MAC entity when the MAC entity has UL resources for new transmission;

NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between.

mpe-ProhibitTimer expires or has expired and the MPE indication has changed more than mpe-ReportThreshold dB for at least one activated Serving Cell of any MAC entity since the last transmission of a PHR in this MAC entity when the MAC entity has UL resources for new transmission;
  phr-PeriodicTimer expires;
  upon configuration or reconfiguration of the power headroom reporting functionality by upper layers, which is not used to disable the function;
  activation of an SCell of any MAC entity with configured uplink;
  addition of the PSCell (i.e. PSCell is newly added or changed);
  phr-ProhibitTimer expires or has expired, when the MAC entity has UL resources for new transmission, and the following is true for any of the activated Serving Cells of any MAC entity with configured uplink:
  there are UL resources allocated for transmission or there is a PUCCH transmission on this cell, and the required power backoff due to power management (as allowed by $P\text{-}MPR_c$ as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.

NOTE 2: The MAC entity should avoid triggering a PHR when the required power backoff due to power management decreases only temporarily (e.g. for up to a few tens of milliseconds) and it should avoid reflecting such temporary decrease in the values of $P_{CMAX,f,c}$/PH when a PHR is triggered by other triggering conditions.

If the MAC entity has UL resources allocated for a new transmission the MAC entity shall:
  1> if it is the first UL resource allocated for a new transmission since the last MAC reset:
    2> start phr-PeriodicTimer;
  1> if the Power Headroom reporting procedure determines that at least one PHR has been triggered and not cancelled; and
  1> if the allocated UL resources can accommodate the MAC CE for PHR which the MAC entity is configured to transmit, plus its subheader, as a result of LCP as defined in clause 5.4.3.1:
    2> if multiplePHR with value true is configured:
      3> for each activated Serving Cell with configured uplink associated with any MAC entity:
        4> obtain the value of the Type 1 or Type 3 power headroom for the corresponding uplink carrier as specified in clause 7.7 of TS 38.213 [6];
        4> if this MAC entity has UL resources allocated for transmission on this Serving Cell; or
        4> if the other MAC entity, if configured, has UL resources allocated for transmission on this Serving Cell and phr-ModeOtherCG is set to real by upper layers:
          5> obtain the value for the corresponding $P_{CMAX,f,c}$ field from the physical layer
          5> if includeMPE is set to true:
            6> obtain the value for the corresponding MPE field from the physical layer.
      3> if phr-Type2OtherCell with value true is configured:
        4> if the other MAC entity is E-UTRA MAC entity:
          5> obtain the value of the Type 2 power headroom for the SpCell of the other MAC entity (i.e. E-UTRA MAC entity);
          5> if phr-ModeOtherCG is set to real by upper layers:
            6> obtain the value for the corresponding $P_{CMAX,f,c}$ field for the SpCell of the other MAC entity (i.e. E-UTRA MAC entity) from the physical layer.
      3> instruct the Multiplexing and Assembly procedure to generate and transmit the Multiple Entry PHR MAC CE as defined in clause 6.1.3.9 based on the values reported by the physical layer.
    2> else (i.e. Single Entry PHR format is used):
      3> obtain the value of the Type 1 power headroom from the physical layer for the corresponding uplink carrier of the PCell;
      3> obtain the value for the corresponding $P_{CMAX,f,c}$ field from the physical layer;
      3> if includeMPE is set to true:
        4> obtain the value for the corresponding MPE field from the physical layer
      3> instruct the Multiplexing and Assembly procedure to generate and transmit the Single Entry PHR MAC CE as defined in clause 6.1.3.8 based on the values reported by the physical layer.
    2> start or restart phr-Periodic Timer;
    2> if the PHR was triggered (at least) due to a change of the MPE indication:
      3> start or restart the mpe-ProhibitTimer;

2> if the PHR was not triggered (at least) due to a change of the MPE indication:
3> start or restart phr-ProhibitTimer;
2> cancel all triggered PHR(s).
End of example implementation Example C In Example C the UE maintains one mpe-ProhibitTimer for each serving cell. If the timer has expired for a serving cell and the MPE value for that serving cell changes (e.g., by at least more than a configured threshold), the UE will trigger a PHR MAC CE which includes the MPE indication.

In this example the UE will start the mpe-ProhibitTimer only for the serving cell(s) which triggered the MAC CE transmission. Note that there can be more than one.

In comparison with Example A, for example, it can be seen that the implementation includes timers per serving cell.

Beginning of example implementation
5.4.6 Power Headroom Reporting
The Power Headroom reporting procedure is used to provide the serving gNB with the following information:
  Type 1 power headroom: the difference between the nominal UE maximum transmit power and the estimated power for UL-SCH transmission per activated Serving Cell;
  Type 2 power headroom: the difference between the nominal UE maximum transmit power and the estimated power for UL-SCH and PUCCH transmission on SpCell of the other MAC entity (i.e. E-UTRA MAC entity in EN-DC, NE-DC, and NGEN-DC cases);
  Type 3 power headroom: the difference between the nominal UE maximum transmit power and the estimated power for SRS transmission per activated Serving Cell.
RRC controls Power Headroom reporting by configuring the following parameters:
  phr-PeriodicTimer;
  phr-ProhibitTimer;
  phr-Tx-PowerFactorChange;
  phr-Type2OtherCell;
  phr-ModeOtherCG;
  multiplePHR
  mpe-ProhibitTimer (one per Serving Cell).
A Power Headroom Report (PHR) shall be triggered if any of the following events occur:
  phr-ProhibitTimer expires or has expired and the path loss has changed more than phr-Tx-PowerFactorChange dB for at least one activated Serving Cell of any MAC entity which is used as a pathloss reference since the last transmission of a PHR in this MAC entity when the MAC entity has UL resources for new transmission;
  NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between.
  mpe-ProhibitTimer expires or has expired for an activated Serving Cell and the MPE indication has changed more than mpe-ReportThreshold dB for the Serving Cell of any MAC entity since the last transmission of a PHR in this MAC entity when the MAC entity has UL resources for new transmission;
  phr-PeriodicTimerexpires;
  upon configuration or reconfiguration of the power headroom reporting functionality by upper layers, which is not used to disable the function;
  activation of an SCell of any MAC entity with configured uplink;
  addition of the PSCell (i.e. PSCell is newly added or changed);
  phr-ProhibitTimer expires or has expired, when the MAC entity has UL resources for new transmission, and the following is true for any of the activated Serving Cells of any MAC entity with configured uplink:
    there are UL resources allocated for transmission or there is a PUCCH transmission on this cell, and the required power backoff due to power management (as allowed by P-MPR$_c$ as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.
NOTE 2: The MAC entity should avoid triggering a PHR when the required power backoff due to power management decreases only temporarily (e.g. for up to a few tens of milliseconds) and it should avoid reflecting such temporary decrease in the values of $P_{CMAX,f,c}$/PH when a PHR is triggered by other triggering conditions.

If the MAC entity has UL resources allocated for a new transmission the MAC entity shall:
  1> if it is the first UL resource allocated for a new transmission since the last MAC reset:
    2> start phr-PeriodicTimer;
  1> if the Power Headroom reporting procedure determines that at least one PHR has been triggered and not cancelled; and
  1> if the allocated UL resources can accommodate the MAC CE for PHR which the MAC entity is configured to transmit, plus its subheader, as a result of LCP as defined in clause 5.4.3.1:
    2> if multiplePHR with value true is configured:
      3> for each activated Serving Cell with configured uplink associated with any MAC entity:
        4> obtain the value of the Type 1 or Type 3 power headroom for the corresponding uplink carrier as specified in clause 7.7 of TS 38.213 [6];
        4> if this MAC entity has UL resources allocated for transmission on this Serving Cell; or
        4> if the other MAC entity, if configured, has UL resources allocated for transmission on this Serving Cell and phr-ModeOtherCG is set to real by upper layers:
          5> obtain the value for the corresponding $P_{CMAX,f,c}$ field from the physical layer
          5> if includeMPE is set to true:
            6> obtain the value for the corresponding MPE field from the physical layer:
            6> if the PHR MAC CE was triggered by this serving cell
              7> start mpe-ProhibitTimer for this Serving Cell.

3> if phr-Type2OtherCell with value true is configured:
  4> if the other MAC entity is E-UTRA MAC entity:
    5> obtain the value of the Type 2 power headroom for the SpCell of the other MAC entity (i.e. E-UTRA MAC entity);
    5> if phr-ModeOtherCG is set to real by upper layers:
      6> obtain the value for the corresponding $P_{CMAX,f,c}$ field for the SpCell of the other MAC entity (i.e. E-UTRA MAC entity) from the physical layer.
  3> instruct the Multiplexing and Assembly procedure to generate and transmit the Multiple Entry PHR MAC CE as defined in clause 6.1.3.9 based on the values reported by the physical layer.
2> else (i.e. Single Entry PHR format is used):
  3> obtain the value of the Type 1 power headroom from the physical layer for the corresponding uplink carrier of the PCell;
  3> obtain the value for the corresponding $P_{CMAX,f,c}$ field from the physical layer
  3> if includeMPE is set to true:
    4> obtain the value for the corresponding MPE field from the physical layer:
  3> instruct the Multiplexing and Assembly procedure to generate and transmit the Single Entry PHR MAC CE as defined in clause 6.1.3.8 based on the values reported by the physical layer.
2> start or restart phr-Periodic Timer;
2> start or restart phr-ProhibitTimer;
2> cancel all triggered PHR(s).
End of example implementation Example D Example D is similar to Example C, but the UE reports only the up-to-date MPE value for the serving cell(s) (there may be more than one) which triggered the PHR MAC CE.
Beginning of example implementation
5.4.6 Power Headroom Reporting
The Power Headroom reporting procedure is used to provide the serving gNB with the following information:
  Type 1 power headroom: the difference between the nominal UE maximum transmit power and the estimated power for UL-SCH transmission per activated Serving Cell;
  Type 2 power headroom: the difference between the nominal UE maximum transmit power and the estimated power for UL-SCH and PUCCH transmission on SpCell of the other MAC entity (i.e. E-UTRA MAC entity in EN-DC, NE-DC, and NGEN-DC cases);
  Type 3 power headroom: the difference between the nominal UE maximum transmit power and the estimated power for SRS transmission per activated Serving Cell.
RRC controls Power Headroom reporting by configuring the following parameters:
  phr-PeriodicTimer;
  phr-ProhibitTimer;
  phr-Tx-PowerFactorChange;
  phr-Type2OtherCell;
  phr-ModeOtherCG;
  multiplePHR
  mpe-ProhibitTimer (one per Serving Cell).

A Power Headroom Report (PHR) shall be triggered if any of the following events occur:
  phr-ProhibitTimer expires or has expired and the path loss has changed more than phr-Tx-PowerFactorChange dB for at least one activated Serving Cell of any MAC entity which is used as a pathloss reference since the last transmission of a PHR in this MAC entity when the MAC entity has UL resources for new transmission;
  NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between.
  mpe-ProhibitTimer expires or has expired for an activated Serving Cell and the MPE indication has changed more than mpe-ReportThreshold dB for the Serving Cell of any MAC entity since the last transmission of a PHR in this MAC entity when the MAC entity has UL resources for new transmission;
  phr-PeriodicTimerexpires;
  upon configuration or reconfiguration of the power headroom reporting functionality by upper layers, which is not used to disable the function;
  activation of an SCell of any MAC entity with configured uplink;
  addition of the PSCell (i.e. PSCell is newly added or changed);
  phr-ProhibitTimer expires or has expired, when the MAC entity has UL resources for new transmission, and the following is true for any of the activated Serving Cells of any MAC entity with configured uplink:
    there are UL resources allocated for transmission or there is a PUCCH transmission on this cell, and the required power backoff due to power management (as allowed by P-MPR$_c$ as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.
  NOTE 2: The MAC entity should avoid triggering a PHR when the required power backoff due to power management decreases only temporarily (e.g. for up to a few tens of milliseconds) and it should avoid reflecting such temporary decrease in the values of $P_{CMAX,f,c}$/PH when a PHR is triggered by other triggering conditions.

If the MAC entity has UL resources allocated for a new transmission the MAC entity shall:
1> if it is the first UL resource allocated for a new transmission since the last MAC reset:
  2> start phr-PeriodicTimer;
1> if the Power Headroom reporting procedure determines that at least one PHR has been triggered and not cancelled; and
1> if the allocated UL resources can accommodate the MAC CE for PHR which the MAC entity is configured to transmit, plus its subheader, as a result of LCP as defined in clause 5.4.3.1:
  2> if multiplePHR with value true is configured:
    3> for each activated Serving Cell with configured uplink associated with any MAC entity:
      4> obtain the value of the Type 1 or Type 3 power headroom for the corresponding uplink carrier as specified in clause 7.7 of TS 38.213 [6];
      4> if this MAC entity has UL resources allocated for transmission on this Serving Cell; or 4> if the other MAC entity, if configured, has UL resources allocated for transmission on this Serving Cell and phr-ModeOtherCG is set to real by upper layers:
    5> obtain the value for the corresponding $P_{CMAX,f,c}$ field from the physical layer
    5> if includeMPE is set to true:
        6> if the PHR MAC CE was triggered by this serving cell
            7> obtain the value for the corresponding MPE field from the physical layer:
            7> start mpe-ProhibitTimer for this Serving Cell
        6> else:
            7> apply the most recent value reported from physical layer as the value for the corresponding MPE field.
3> if phr-Type2OtherCell with value true is configured:
    4> if the other MAC entity is E-UTRA MAC entity:
        5> obtain the value of the Type 2 power headroom for the SpCell of the other MAC entity (i.e. E-UTRA MAC entity);
        5> if phr-ModeOtherCG is set to real by upper layers:
            6> obtain the value for the corresponding $P_{CMAX,f,c}$ field for the SpCell of the other MAC entity (i.e. E-UTRA MAC entity) from the physical layer.
3> instruct the Multiplexing and Assembly procedure to generate and transmit the Multiple Entry PHR MAC CE as defined in clause 6.1.3.9 based on the values reported by the physical layer.
2> else (i.e. Single Entry PHR format is used):
    3> obtain the value of the Type 1 power headroom from the physical layer for the corresponding uplink carrier of the PCell;
    3> obtain the value for the corresponding $P_{CMAX,f,c}$ field from the physical layer
    3> if includeMPE is set to true:
        4> obtain the value for the corresponding MPE field from the physical layer:
    3> instruct the Multiplexing and Assembly procedure to generate and transmit the Single Entry PHR MAC CE as defined in clause 6.1.3.8 based on the values reported by the physical layer.
2> start or restart phr-Periodic Timer;
2> start or restart phr-ProhibitTimer;
2> cancel all triggered PHR(s).

Abbreviations

At least some of the following abbreviations may be used in this disclosure. If there is an inconsistency between abbreviations, preference should be given to how it is used above. If listed multiple times below, the first listing should be preferred over any subsequent listing(s).
MPE Maximum Permitted Exposure
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for reporting to a base station, the method comprising:
configuring one or more Maximum Permissible Exposure (MPE)-related criteria for triggering Power HeadRoom (PHR) reporting towards the base station;
configuring one or more non-MPE-related criteria for triggering PHR reporting towards the base station;
controlling a timing of PHR reporting triggered solely by the one or more MPE-related criteria according to a first prohibit timer; and
controlling a timing of PHR reporting triggered solely by the one or more non-MPE-related criteria according to a second prohibit timer that is separate from the first prohibit timer.

2. The method of claim 1, wherein controlling the timing of PHR reporting triggered solely by the one or more MPE-related criteria according to the first prohibit timer comprises transmitting a given PHR report that is triggered solely by the one or more MPE-related criteria and correspondingly starting the first prohibit timer, and not transmitting a next PHR report that is triggered solely by the one or more MPE-related criteria until expiration of the first prohibit timer.

3. The method of claim 1, wherein controlling the timing of PHR reporting triggered solely by the one or more non-MPE-related criteria according to the second prohibit timer comprises transmitting a given PHR report that is triggered solely by the one or more non-MPE-related criteria and correspondingly starting the second prohibit timer, and not transmitting a next PHR report that is triggered solely by the one or more non-MPE-related criteria until expiration of the second prohibit timer.

4. The method of claim 1, wherein the one or more MPE-related criteria comprise any one or more of the following: expiration of a periodic reporting timer, activation of a transmit power limitation at the wireless device for compliance with MPE requirements, a change in MPE-related transmit power limits at the wireless device, or more than a threshold change in MPE-related transmit power limits at the wireless device.

5. The method of claim 1, wherein the one or more non-MPE-related criteria comprise any one or more of: expiration of a periodic reporting timer, a change in path loss between the wireless device and the base station, or more than a threshold change in the pathloss.

6. The method of claim 1, wherein configuring the one or more MPE-related criteria and the one or more non-MPE-related criteria comprises receiving configuration signaling from the base station, indicating the one or more MPE-related criteria and the one or more non-MPE-related criteria.

7. The method of claim 6, wherein the configuration signaling further indicates the first and second prohibit timers.

8. The method of claim 1, wherein configuring the one or more MPE-related criteria and the one or more non-MPE-related criteria comprises using configuration information stored in the wireless device.

9. A wireless device configured for reporting to a base station, the wireless device comprising:
transceiver circuitry for transmitting signals to the base station and receiving signals from the base station; and
processing circuitry configured to:
configure one or more Maximum Permissible Exposure (MPE)-related criteria for triggering Power HeadRoom (PHR) reporting towards the base station;
configure one or more non-MPE-related criteria for triggering PHR reporting towards the base station;
control a timing of PHR reporting triggered solely by the one or more MPE-related criteria according to a first prohibit timer; and
control a timing of PHR reporting triggered solely by the one or more non-MPE-related criteria according to a second prohibit timer that is separate from the first prohibit timer.

* * * * *